United States Patent
Omori

(10) Patent No.: US 9,011,008 B2
(45) Date of Patent: Apr. 21, 2015

(54) RADIAL FOIL BEARING

(75) Inventor: Naomichi Omori, Tokyo (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 14/233,006

(22) PCT Filed: Jul. 6, 2012

(86) PCT No.: PCT/JP2012/067384
§ 371 (c)(1),
(2), (4) Date: Jan. 15, 2014

(87) PCT Pub. No.: WO2013/015098
PCT Pub. Date: Jan. 31, 2013

(65) Prior Publication Data
US 2014/0153850 A1    Jun. 5, 2014

(30) Foreign Application Priority Data
Jul. 22, 2011    (JP) ................................ 2011-160772

(51) Int. Cl.
*F16C 32/06*    (2006.01)
*F16C 17/02*    (2006.01)
(Continued)

(52) U.S. Cl.
CPC .............. *F16C 17/024* (2013.01); *F16C 33/04* (2013.01); *F16C 27/02* (2013.01)

(58) Field of Classification Search
CPC ...... F16C 17/024; F16C 17/042; F16C 33/04; F16C 27/02
USPC ................................................ 384/100–124
See application file for complete search history.

(56) References Cited

U.S. PATENT DOCUMENTS

| 8,794,838 B1* | 8/2014 | Rosen et al. .................. 384/103 |
| 2002/0054718 A1* | 5/2002 | Weissert ....................... 384/104 |

(Continued)

FOREIGN PATENT DOCUMENTS

| JP | 2002-364643 | 12/2002 |
| JP | 2003-074550 | 3/2003 |

(Continued)

OTHER PUBLICATIONS

International Search Report and Written Opinion mailed Oct. 9, 2012 in corresponding PCT International Application No. PCT/JP2012/067384.

(Continued)

*Primary Examiner* — Alan B Waits
(74) *Attorney, Agent, or Firm* — Ostrolenk Faber LLP

(57) ABSTRACT

The radial foil bearing (3, 20) includes, a cylindrical top foil (10, 21), a back foil (11) disposed on a radially outer side of the top foil (10, 21), and a cylindrical bearing housing (12, 25) accommodating the top foil (10, 21) and the back foil (11). The top foil (10, 21) is formed by winding a rectangular metal foil around a rotary shaft (1) in a circumferential direction thereof. The metal foil includes a first uneven portion (17a, 23a) which has a first projecting portion (15a, 22a) and a first depressed portion (16a, 23a) on a first side thereof, and a second uneven portion (17b, 24b) which has a second projecting portion (15b, 22b) and a second depressed portion (16b, 23b) on a second side opposite to the first side. The metal foil is wound in a cylindrical shape so that the first uneven portion (17a, 23a) and the second uneven portion (17b, 24b) overlap with each other. The first projecting portion (15a, 22a) and the second projecting portion (15b, 22b) are pulled out near the bearing housing (12, 25) through the second depressed portion (16b, 23b) and the first depressed portion (16a, 23a) respectively, and engage with engagement grooves (13, 26) formed on the inner circumferential surface of the bearing housing (12, 25).

6 Claims, 3 Drawing Sheets

(51) Int. Cl.
*F16C 33/04* (2006.01)
*F16C 27/02* (2006.01)

(56) References Cited

U.S. PATENT DOCUMENTS

| | | | |
|---|---|---|---|
| 2002/0106138 A1 | 8/2002 | Akizuki | 384/106 |
| 2004/0042692 A1* | 3/2004 | Matsunaga | 384/103 |
| 2005/0163407 A1* | 7/2005 | Kang et al. | 384/106 |
| 2005/0185865 A1* | 8/2005 | Agrawal | 384/106 |
| 2006/0018574 A1* | 1/2006 | Kang et al. | 384/106 |
| 2007/0047858 A1* | 3/2007 | Hurley et al. | 384/106 |
| 2008/0253704 A1* | 10/2008 | Struziak et al. | 384/106 |
| 2008/0310779 A1* | 12/2008 | Agrawal et al. | 384/106 |
| 2011/0052110 A1* | 3/2011 | Kim | 384/106 |
| 2011/0103725 A1* | 5/2011 | Omori | 384/276 |
| 2012/0027327 A1* | 2/2012 | McAuliffe et al. | 384/114 |
| 2012/0045154 A1* | 2/2012 | Ermilov | 384/103 |
| 2012/0281937 A1* | 11/2012 | Heshmat et al. | 384/106 |
| 2014/0140645 A1* | 5/2014 | Meacham et al. | 384/129 |
| 2014/0147064 A1* | 5/2014 | Omori | 384/103 |
| 2014/0153850 A1* | 6/2014 | Omori | 384/106 |
| 2014/0154058 A1* | 6/2014 | Meacham et al. | 415/170.1 |
| 2014/0169708 A1* | 6/2014 | Omori | 384/106 |
| 2014/0205221 A1* | 7/2014 | Saville et al. | 384/129 |
| 2014/0219590 A1* | 8/2014 | Omori et al. | 384/106 |
| 2014/0226925 A1* | 8/2014 | Yoshino et al. | 384/103 |
| 2014/0241653 A1* | 8/2014 | Omori | 384/106 |
| 2014/0270603 A1* | 9/2014 | Rosen et al. | 384/103 |
| 2014/0270604 A1* | 9/2014 | Rosen et al. | 384/103 |
| 2014/0270605 A1* | 9/2014 | Rosen et al. | 384/103 |

FOREIGN PATENT DOCUMENTS

| | | |
|---|---|---|
| JP | 2004-190762 | 7/2004 |
| JP | 2004-270904 | 9/2004 |
| JP | 2006-057652 | 3/2006 |
| JP | 2006-057828 | 3/2006 |
| JP | 2009-299748 | 12/2009 |
| JP | 2013-217425 | 10/2013 |

OTHER PUBLICATIONS

Korean Notice of Allowance, dated Jan. 5, 2015, issued corresponding Korean Patent Application No. 10-2014-7003401. English translation. Total 3 pages.
European Search Report, dated Mar. 5, 2015, issued in corresponding European Patent Application No. 12817752.4. Total 4 pages.

* cited by examiner

RADIAL FOIL BEARING

CROSS-REFERENCE TO RELATED APPLICATIONS

The present application is a 35 U.S.C. §§371 national phase conversion of PCT/JP2012/067384, filed Jul. 6, 2012, which claims priority to Japanese Patent Application No. 2011-160772, filed Jul. 22, 2011, the contents of which are incorporated herein by reference. The PCT International Application was published in the Japanese language.

TECHNICAL FIELD

The present invention relates to a radial foil bearing.

BACKGROUND ART

In the related art, as a bearing for a high-speed rotating body, a radial bearing, which is used in a state of being attached so as to enclose a rotary shaft, is known. As such a radial bearing, a radial foil bearing is well known, which includes a thin sheet-like top foil which forms a bearing surface, a back foil which elastically supports the top foil, and a cylindrical bearing housing which accommodates the top foil and the back foil. As the back foil of the radial foil bearing, a bump foil, in which a thin sheet is formed in a wave shape, is mainly used.

In general, in the radial foil bearing, in order to prevent the top foil or the bump foil from being detached from the bearing housing, one end (toe portion) of the top foil or the bump foil is directly fixed to the bearing housing or is indirectly fixed thereto via a spacer, using spot welding.

Moreover, in Patent Document 1, each of both ends of the top foil is locked so as to butt against a retaining wall of an inner wall of the housing and is fixed thereto.

DOCUMENT OF RELATED ART

Patent Document

[Patent Document 1] Japanese Unexamined Patent Application, First Publication No. 2006-57828

SUMMARY OF INVENTION

Technical Problem

However, when the top foil is welded, since heat is applied to the top foil, there is a strong possibility of distortion occurring in the top foil. Moreover, in order to perform a mechanical fixation instead of the welding, a configuration in which one end (toe portion) of the top foil is bent is also known. However, also in this case, there is a possibility of distortion occurring in the top foil due to the bending. Moreover, in Patent Document 1, since both ends of the top foil butt against the retaining wall, a reaction force is applied to the top foil from both end portions of the top foil toward the center portion thereof, and thus, distortion may occur therein.

The thickness of a fluid lubricating film of a foil bearing, which is formed between the rotary shaft and the top foil by rotation of the rotary shaft, is approximately 10 µm, which is extremely thin. Accordingly, if slight distortion occurs in the top foil, the load capability or dynamic characteristics (rigidity and damping performance) of the bearing are influenced, and the desired performance may not be obtained.

Moreover, in a general top foil in which one end (toe portion) is fixed to a bearing housing by spot welding, the vicinities of both ends thereof (near the toe and near a free end) are not easily deformed to be along a curved surface which composes the inner circumferential surface of the bearing housing and become close to planes. In this case, a force (local preload) clamping the rotary shaft occurs in the above portions close to planes. As a result, the starting torque may be increased, and the amount of heat generated during operation may be increased to be higher than a set value.

Moreover, in Patent Document 1, since distortion may occur in the top foil due to the reaction force, the top foil does not become a shape close to a perfect circle along the inner circumferential surface of the bearing housing, and may become a shape close to a polygonal shape having a partial plane portion due to distortion. In this case, a portion close to the plane portion strongly contacts the rotary shaft, a force (local preload) clamping the rotary shaft occurs, and thus, the starting torque may be increased, or the amount of heat generated during operation may be increased to be higher than a set value.

As a method which decreases the force (local preload) clamping the rotary shaft, for example, a method is considered which removes peaks of a bump foil (back foil) supporting the vicinities of both ends of the top foil. However, if the peaks of the bump foil are removed, the supporting rigidity of the rotary shaft is significantly decreased in the portion in which the peaks are removed. Accordingly, movement of the rotary shaft toward the above portion due to impact load or the like cannot be prevented, and a probability of a rotating portion such as an impeller provided in the rotary shaft contacting a stationary portion (housing or the like) is increased.

Moreover, in order to prevent an excessive decrease of the supporting rigidity of the rotary shaft in the portion in which peaks are removed, a method which decreases heights of peaks of the bump foil in the above portion instead of removing the peaks is considered. However, since the amount of the decrease in height is small such as several tens of micrometers, the manufacturing of the bump foil is extremely difficult.

The present invention is made in consideration of the above-described circumstances, and a first object thereof is to provide a radial foil bearing which sufficiently decreases distortion occurring in a top foil and which can obtain the designed favorable performance with respect to a load capability or dynamic characteristics (rigidity and damping performance) of the bearing. In addition, a second object thereof is to provide a radial foil bearing which can prevent occurrence of a force (local preload) clamping a rotary shaft.

Solution to Problem

According to a first aspect of the present invention, a radial foil bearing for enclosing and supporting a rotary shaft, including: a cylindrical top foil disposed so as to face the rotary shaft; a back foil disposed on a radially outer side of the top foil; and a cylindrical bearing housing accommodating the top foil and the back foil. Engagement grooves are formed on an inner circumferential surface of the bearing housing in an axial direction of the bearing housing. The top foil is formed by winding a rectangular metal foil around the rotary shaft in a circumferential direction thereof. The metal foil includes a first uneven portion which has a first projecting portion and a first depressed portion on a first side of the metal foil, and a second uneven portion which has a second depressed portion formed so as to include a position corresponding to the first projecting portion and a second projecting portion formed in at least a portion of a position corresponding to the first depressed portion, on a second side opposite to the first side. In addition, the metal foil is wound in a cylindrical shape so that the first uneven portion and the second uneven portion overlap with each other. The first projecting portion and the second projecting portion are pulled out near the bearing housing through the second depressed portion and the first depressed portion respectively. Moreover, the first projecting portion and the second projecting portion, which are pulled out near the bearing housing, engage with the corresponding engagement grooves.

In the radial foil bearing, the metal foil including the first uneven portion and the second uneven portion is wound in a cylindrical shape so that the first uneven portion and the second uneven portion overlap with each other, the projecting portion of each uneven portion is pulled out near the bearing housing, and the pulled projecting portions engage with the engagement grooves which are formed on the inner circumferential surface of the bearing housing. Accordingly, without performing spot welding or bending on the top foil and without occurrence of a strong reaction force toward a center portion from both end portions due to butting of both end portions against the bearing housing, the top foil can be accommodated into and fixed to the bearing housing. Therefore, the distortion occurring in the top foil is suppressed, and the distortion of the top foil can be sufficiently decreased.

According to a second aspect of the present invention, in the first aspect, a thin portion is formed on each of the first side and the second side in the top foil, wherein the thin portion is thinner than an intermediate portion between the first side and the second side.

In this case, both end portions of the top foil are easily deformed elastically, and occurrence of a force (local preload) clamping the rotary shaft on both end portions is suppressed.

According to a third aspect of the present invention, in the second aspect, the thin portion is formed in a state where an outer circumferential surface of the thin portion is depressed further than an outer circumferential surface of the intermediate portion.

In this case, in the thin portion, a gap is formed between the thin portion and the back foil supporting the outer circumferential surface of the thin portion. Accordingly, occurrence of a force (local preload) clamping the rotary shaft is securely prevented in the thin portion.

According to a fourth aspect of the present invention, in any one of the first to the third aspects, at least one of the engagement grooves is formed in a portion of the entire length in the axial direction of the bearing housing.

In this case, even when deviation in the axial direction occurs between the top foil and the bearing housing, since the projecting portion, which engages with the engagement groove formed in a portion in the axial direction of the bearing housing, is regulated by the end of the engagement groove and the movement of the projecting portion stops, deviation more than in the above is prevented. Accordingly, detachment of the top foil from the bearing housing is securely prevented.

Effects of Invention

According to a radial foil bearing of the present invention, distortion occurring in the top foil is suppressed, and the distortion of the top foil can be sufficiently decreased. As a result, the designed favorable performance with respect to a load capability or dynamic characteristics (rigidity and damping performance) of the bearing can be obtained.

DESCRIPTION OF EMBODIMENTS

Figure 1:
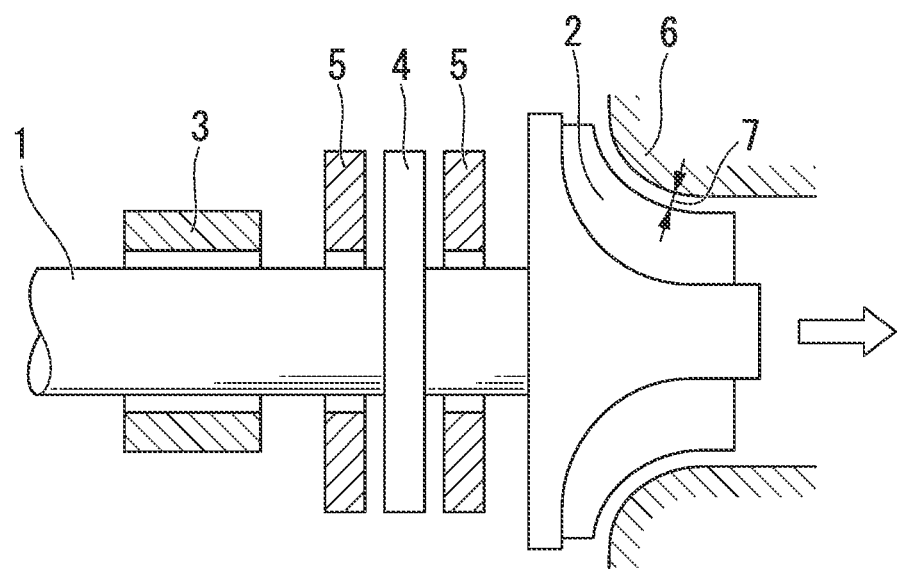
FIG. 1 is a schematic view showing an example of a turbo machine to which a radial foil bearing according to a first embodiment of the present invention is applied.

Hereinafter, a radial foil bearing of the present invention will be described in detail with reference to the drawings. Moreover, in order to show each member in a recognizable size in the drawings below, a scale of each member is appropriately changed.

First Embodiment

FIG. 1 is a side view showing an example of a turbo machine to which a radial foil bearing of a first embodiment of the present invention is applied. In FIG. 1, a reference numeral 1 indicates a rotary shaft, a reference numeral 2 indicates an impeller provided in the tip of the rotary shaft, and a reference numeral 3 indicates the radial foil bearing according to the present invention. Moreover, in FIG. 1, only one radial foil bearing is shown while another radial foil bearing is omitted. However, in general, two radial foil bearings are provided in an axial direction of the rotary shaft 1, and thus, a support structure for the rotary shaft 1 is configured. Accordingly, although it is not shown, also in the present embodiment, two radial foil bearings 3 are provided.

In the rotary shaft 1, a thrust collar 4 is fixed to a side on which the impeller 2 is formed. On each of both sides of the thrust collar 4, a thrust bearing 5 is disposed so as to face the thrust collar 4.

Moreover, the impeller 2 is disposed inside a housing 6 which is a stationary side, and a tip clearance 7 is provided between the impeller 2 and the housing 6.

In addition, the radial foil bearing 3 is attached so as to enclose the rotary shaft 1 at a position nearer the center of the rotary shaft 1 than the thrust collar 4.

Figure 2A:
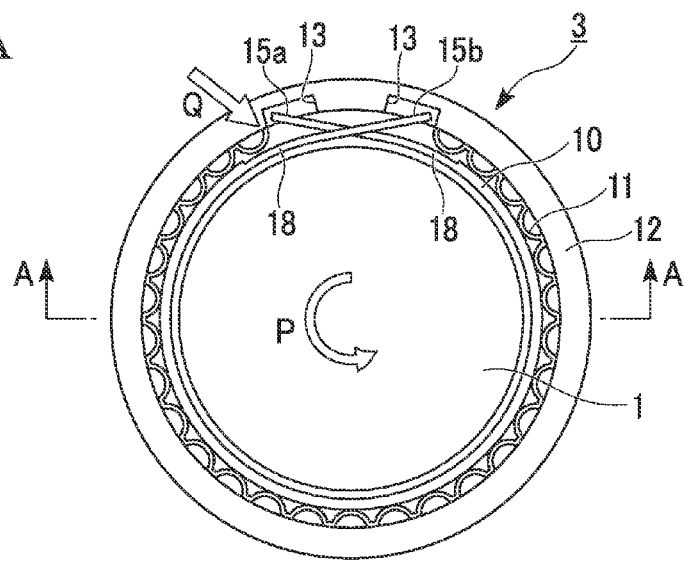
FIG. 2A is a side view showing a schematic configuration of the radial foil bearing according to the first embodiment of the present invention.

FIGS. 2A to 2D are views showing a first embodiment of the radial foil bearing which is applied to the turbo machine having the above-described configuration. As shown in FIG. 2A, the radial foil bearing 3 of the first embodiment is formed in a cylindrical shape which encloses the rotary shaft 1 and supports the rotary shaft 1. The radial foil bearing 3 includes a cylindrical top foil 10 which is disposed so as to face the rotary shaft 1, a bump foil 11 (back foil) which is disposed on the radially outer side of the top foil 10, and a bearing housing 12 which is disposed on the radially outer side of the bump foil 11.

Figure 2B:
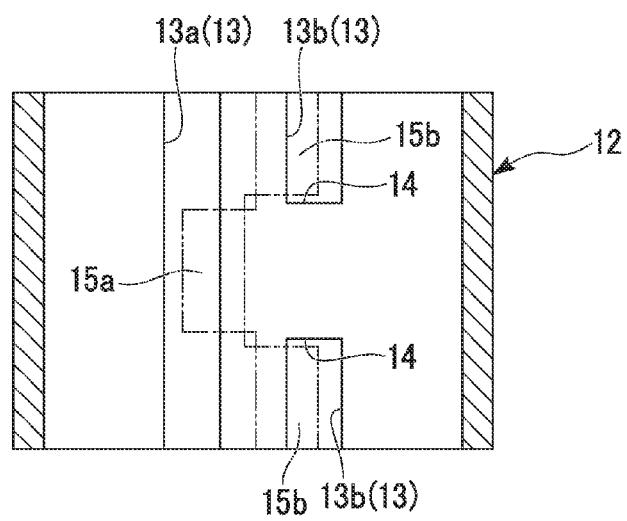
FIG. 2B is a cross-sectional view along an A-A line of FIG. 2A.

The bearing housing 12 composes the outermost portion of the radial foil bearing 3 and is formed in a cylindrical shape using metal. The bearing housing 12 accommodates the bump foil 11 and the top foil 10 in the inside thereof. Engagement grooves 13 are formed on the inner circumferential surface of the bearing housing 12 in the axial direction of the bearing housing 12. The engagement grooves 13 include a first engagement groove 13a and second engagement grooves 13b. That is, as shown in FIG. 2B which shows an inner circumferential surface of the bearing housing 12, the first engagement groove 13a is formed over the entire length in the axial direction of the bearing housing 12 on the inner circumferential surface of the bearing housing 12. Moreover, in the vicinity of the first engagement groove 13a in the circumferential direction of the bearing housing 12, the second engagement groove 13b is formed in only a portion of the entire length in the axial direction of the bearing housing 12. In other words, the second engagement groove 13b is not formed over the entire length in the axial direction of the bearing housing 12.

In the present embodiment, two second engagement grooves 13b are formed near the first engagement groove 13a. The two second engagement grooves 13b are disposed on a straight line parallel to the axial direction of the bearing housing 12. One of the second engagement grooves 13b is formed so as to extend from one side end of the bearing housing 12 toward the center thereof, and the other is formed so as to extend from the other side end of the bearing housing 12 toward the center. Accordingly, the second engagement grooves 13b do not communicate with each other at an axially center portion of the bearing housing 12, and at positions near the center of the bearing housing 12 in the second engagement grooves 13b, bank portions 14 which block the above portions of the grooves are formed. Moreover, the depths of the engagement grooves 13a and 13b are approximately 0.1 millimeters to several millimeters.

As shown in FIG. 2A, the bump foil 11 is a back foil which is formed of a foil (thin sheet) and elastically supports the top foil 10. As the back foil, for example, a bump foil; a spring foil which is described in Japanese Unexamined Patent Application, First Publication No. 2006-57652, Japanese Unexamined Patent Application, First Publication No. 2004-270904, or the like; or a back foil which is described in Japanese Unexamined Patent Application, First Publication No. 2009-299748, or the like is used. In the present embodiment, the bump foil is used as the back foil. However, the spring foil or the back foil described above may be used as the back foil of the present invention.

As shown in FIG. 2A, in the bump foil 11, a foil (thin sheet) is formed in a wave shape. The bump foil 11 is entirely formed in a cylindrical shape and is disposed along the inner circumferential surface of the bearing housing 12. Moreover, in the present embodiment, the bump foil 11 is disposed in a state where both ends thereof are separated with a predetermined gap. That is, the bump foil 11 does not cover the engagement grooves 13 and 13 and a portion therebetween, and covers only the inner circumferential surface of the bearing housing 12 except for the above uncovered portions.

Moreover, in the bump foil 11 which is formed in a wave shape, valley portions contacting the bearing housing 12 and peak portions contacting the top foil 10 are alternately formed in the circumferential direction of the radial foil bearing 3. Accordingly, the bump foil 11 elastically supports the top foil 10, particularly through the peak portions contacting the top foil 10. Moreover, fluid passages are formed by peak portions and valley portions in the axial direction of the radial foil bearing 3.

In addition, similar to the related art, the bump foil 11 is fixed to the bearing housing 12 using spot welding or the like.

Figure 2C:
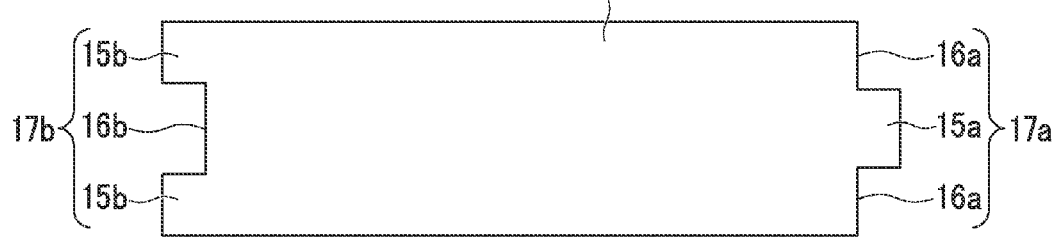
FIG. 2C is a developed plan view of a top foil.

The top foil 10 is formed by winding a rectangular metal foil in a cylindrical shape along the inner surface of the bump foil 11, and is disposed so that a projecting portion 15a (first projecting portion) formed on a first end side of the metal foil and a projecting portion 15b (second projecting portion) formed on a second end side thereof engage with the engagement grooves 13 which are formed in the bearing housing 12. As shown in FIG. 2C which is a developed plan view of the top foil 10, a rectangular metal foil, in which a long side thereof is in a bearing circumferential direction and a short side thereof is in a bearing axial direction, is wound in a cylindrical shape in an arrow direction (the longitudinal direction of the long side: the bearing circumferential direction) of FIG. 2D which is a side view of the top foil, and thereby, the top foil 10 is formed.

As shown in FIG. 2C, in the top foil 10, a first uneven portion 17a including one projecting portion 15a and two depressed portions 16a (first depressed portions) is formed on a first side in the short sides thereof, and a second uneven portion 17b including two projecting portions 15b and one depressed portion 16b (second depressed portion) is formed on a second side opposite to the first side in the short sides thereof. The depressed portion 16b of the second uneven portion 17b is formed at a position corresponding to the projecting portion 15a of the first uneven portion 17a, and the depressed portions 16a of the first uneven portion 17a are formed at positions corresponding to the projecting portions 15b of the second uneven portion 17b.

That is, the depressed portion 16b of the second uneven portion 17b is formed to allow the projecting portion 15a to pass through the inner portion of the depressed portion 16b when the top foil 10 (rectangular metal foil) is wound in a cylindrical shape so that the first uneven portion 17a and the second uneven portion 17b overlap each other. Similarly, each depressed portion 16a of the first uneven portion 17a is formed to allow the projecting portion 15b to pass through the inner portion of the depressed portion 16a when the top foil 10 (rectangular metal foil) is wound in a cylindrical shape.

In this way, as shown in FIG. 2A, the projecting portions 15a and 15b which have respectively passed through the depressed portions 16b and 16a are pulled out near the bearing housing 12, and the tips thereof engage with the engagement grooves 13 of the bearing housing 12. Accordingly, movement of the top foil 10 in the circumferential direction thereof is restricted, and thus, the top foil 10 is disposed so that the amount of movement is slight.

Moreover, the projecting portions 15a and 15b are disposed in a state where the tips do not strongly butt the side wall surfaces or the bottom surfaces of the engagement grooves 13 and are at the vicinities of the side wall surfaces or the bottom surfaces. Accordingly, at a normal operation of the rotary shaft 1, since the projecting portions 15a and 15b do not receive a large reaction force from the engagement grooves 13, distortion occurring in the top foil 10 can be prevented. In addition, even when an unexpected external force due to shaft deflection or the like of the rotary shaft 1 is applied to the radial foil bearing 3, the top foil 10 is not rotated inside the bearing housing 12, and it is possible to prevent the top foil from being detached from a space between the bearing housing 12 and the rotary shaft 1.

That is, when unexpected external force is applied, the projecting portions 15a and 15b are engaged with the side wall surfaces or the bottom surfaces of the engagement grooves 13, and thus, it is possible to prevent the projecting portions 15a and 15b from being separated from the engagement grooves 13. Accordingly, the top foil 10 is prevented from rotating and from being detached from the bearing housing 12 due to the projecting portions 15a and 15b getting out of the depressed portions 16b and 16a after excessive deformation of the top foil 10.

Moreover, as shown in two-dot chain lines in FIG. 2B, particularly, in the projecting portions 15b which engage with the second engagement grooves 13b, the movement of the projecting portions toward an axially center portion (inner side) of the bearing housing 12 is restricted by the second engagement grooves 13b. That is, since the bank portions 14 are formed in the second engagement grooves 13b at positions near the center of the bearing housing 12, even when axial deviation occurs between the top foil 10 and the bearing housing 12, one of two projecting portions 15b contacts the bank portion 14 of the engagement groove 13b, and thus, the movement of the projecting portions 15b, that is, the movement of the top foil 10 is stopped. Accordingly, the top foil 10 is prevented from popping out from the bearing housing 12.

Figure 2D:
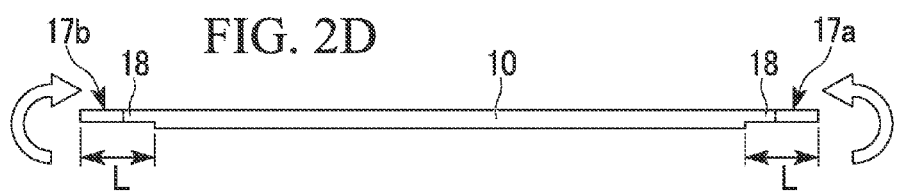
FIG. 2D is a developed side view of the top foil.

As shown in FIG. 2D, in the top foil 10, a thin portion 18 is formed on each of the side (first side) in which the first uneven portion 17a is formed and the side (second side) in which the second uneven portion 17b is formed, wherein the thin portion 18 is thinner than an intermediate portion between the sides. As shown in FIG. 2A, the thin portions 18 are formed to be thinned to be in a state where the outer circumferential surfaces thereof (surfaces near the bump foil 11) are depressed further than the outer circumferential surface of the intermediate portion.

In order to form the thin portions 18, both end portions of the top foil 10 are formed in a desired thickness (thinness) using, for example, etching processing while being controlled by the ten micrometers. Specifically, when a bearing diameter is set at 35 mm, if the thickness of the top foil 10 is set at 100 μm, the thin portions 18 are formed so that the thickness thereof is approximately 80 μm. In addition, compared to bending or the like, in the etching processing, stress occurring in the top foil 10 is extremely small, and thus, distortion hardly occurs in the top foil 10.

In addition, as shown in FIG. 2A, a length L in the circumferential direction of the thin portion 18 shown in FIG. 2D corresponds to a length in which an interval between two engagement grooves 13 adjacent to each other in the circumferential direction and a width of one peak at the end portion of the bump foil 11 are added.

In this way, by forming the thin portions 18 in both end portions of the top foil 10, both end portions (thin portions 18) are easily deformed elastically. Therefore, both end portions become curved surfaces along the curved surfaces composing the inner circumferential surface of the bearing housing 12. Accordingly, a force (local preload) clamping the rotary shaft 1 hardly occurs in both end portions of the top foil 10.

In addition, since the thin portions 18 are formed to be thinned to be in the state where the outer circumferential surfaces of both end portions of the top foil 10 are depressed further than the outer circumferential surface of the intermediate portion, a gap is formed between one peak at the end of the bump foil 11 supporting the outer circumferential surface of the top foil and the thin portion 18. Accordingly, in the thin portions 18, the occurrence of the force (local preload) clamping the rotary shaft 1 is securely prevented. In addition, with respect to the length L in the circumferential direction of the thin portion 18, instead of the example shown in FIG. 2A, the length L may correspond to a length in which an interval between two engagement grooves 13 adjacent to each other in the circumferential direction and widths of approximate three peaks in the end portion of the bump foil 11 are added.

Next, operations of the radial foil bearing 3 having the above-described configuration will be described.

In a state where the rotary shaft 1 stops, the top foil 10 is pressed onto the rotary shaft 1 by the bump foil 11 and closely contacts the rotary shaft 1. Moreover, in the present embodiment, since both end portions of the top foil 10 are the thin portions 18, the force (local preload) clamping the rotary shaft 1 hardly occurs in the thin portions 18.

If the rotary shaft 1 is rotated in an arrow P direction in FIG. 2A, at first, the rotary shaft 1 is rotated at a low speed, and thereafter, is gradually accelerated and rotated at a high speed. Accordingly, as shown by an arrow Q in FIG. 2A, an ambient fluid is led from a space between one end (projecting portion 15a) of the top foil 10 and one end of the bump foil 11, and the ambient fluid flows into a space between the top foil 10 and the rotary shaft 1. Therefore, a fluid lubricating film is formed between the top foil 10 and the rotary shaft 1.

At this time, in a transient state until the fluid lubricating film is formed, solid friction is generated between the rotary shaft 1 and the top foil 10, and the solid friction becomes resistance at the time of starting. However, as described above, the preload does not occur in both end portions of the top foil 10. In addition, the end portion of the top foil 10 at the side into which the ambient fluid flows is the thin portion 18 and thus is flexible, whereby an opening is easily formed between the end of the top foil 10 and the rotary shaft 1, and the fluid can easily flow into the opening. Accordingly, if the rotary shaft 1 starts, the fluid lubricating film is formed early, and the rotary shaft 1 is rotated in a non-contact state with respect to the top foil 10.

In the radial foil bearing 3, the projecting portions 15a and 15b which are pulled out from the depressed portions 16b and 16a are engaged with the engagement grooves 13 which are formed on the inner circumferential surface of the bearing housing 12. Therefore, the top foil 10 can be accommodated into and fixed to the bearing housing 12 without performing spot welding or bending with respect to the top foil 10 and without generating a strong reaction force from both end portions toward the center portion thereof due to both end portions of the top foil 10 butting the bearing housing 12. Accordingly, since distortion occurring in the top foil 10 is suppressed and the distortion of the top foil 10 can be sufficiently decreased, the desired favorable performance can be exerted with respect to a load capability or dynamic characteristics (rigidity or damping performance) of the bearing.

In addition, with respect to the top foil 10, only forming processes of the uneven portions 17a and 17b by etching processing are added, and the spot welding or the bending in the related art having a possibility of occurrence of distortion can be omitted. Therefore, difficulty of the manufacturing is decreased, and the manufacturing cost can be decreased.

Moreover, since there is no welding process of the top foil 10 to the bearing housing 12, errors of assembly or variation in assembly due to welding defects or the like can be suppressed. Accordingly, reproducibility is increased and excellent mass productivity is obtained.

Moreover, as similar in the related art, in the configuration in which a first end side of a top foil is set to a toe with respect to a bearing housing by spot welding and a second end side thereof is set to a free end, when the rotary shaft is reversely rotated, the top foil may be wound around a rotary shaft. In contrast, since the radial foil bearing 3 of the present embodiment is symmetrical in the side view as shown in FIG. 2A, the radial foil bearing accepts both of a normal rotation and a reverse rotation of the rotary shaft 1 and can equally operate in both rotations. Accordingly, the radial foil bearing 3 can also be applied to a rotation machine in which the rotary shaft is reversely rotated.

In addition, since the thin portions 18 are formed on both end portions of the top foil 10, as described above, the force (local preload) clamping the rotary shaft 1 also does not occur in both end portions. Accordingly, an increase in the starting torque due to the preload can be prevented, and heat generation during the operation can be prevented from increasing to be equal to or more than a set value.

Moreover, since the thin portions 18 are formed on both end portions of the top foil 10, for example, a heat treatment process to make both end portions of the top foil fit in the inner curved surfaces (inner circumferential surfaces) of the bearing housing as in the related art is unnecessary.

In addition, since the thin portions 18 are formed on both end portions of the top foil 10, the end portion (corresponding to the free end of the related art) of the top foil 10 at the side into which the ambient fluid flows becomes flexible, and thus, as described above, the ambient fluid easily flows between the top foil 10 and the rotary shaft 1.

Therefore, the fluid lubricating film is formed at a lower rotation rate, and the startability is improved.

Second Embodiment

Next, a radial foil bearing of a second embodiment of the present invention will be described. FIGS. 3A to 3D are views showing the second embodiment of the radial foil bearing which is applied to the turbo machine shown in FIG. 1, and a reference numeral 20 in FIG. 3A indicates the radial foil bearing. The differences between the radial foil bearing 20 and the radial foil bearing 3 shown in FIG. 2A are the shape of the top foil and the shapes of the engagement grooves of the bearing housings corresponding to the top foil. Moreover, in the second embodiment, the same reference numerals are attached to elements similar to the first embodiment, and descriptions thereof are omitted here.

Figure 3A:
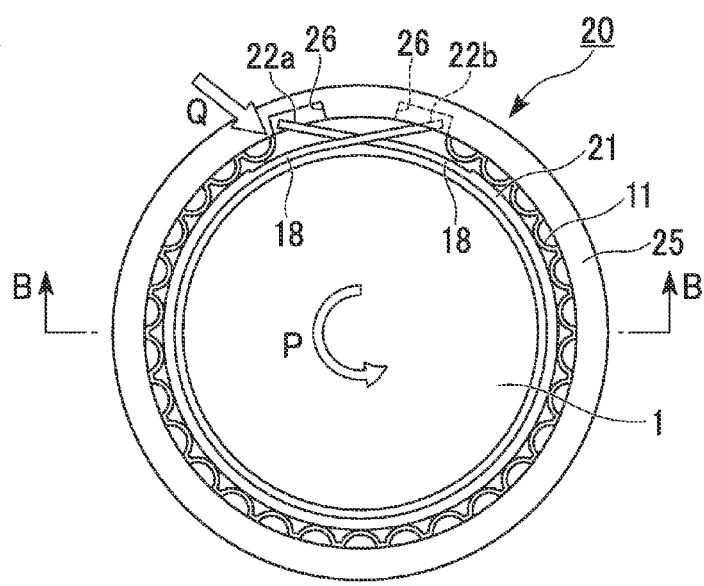
FIG. 3A is a side view showing a schematic configuration of a radial foil bearing according to a second embodiment of the present invention.
Figure 3B:
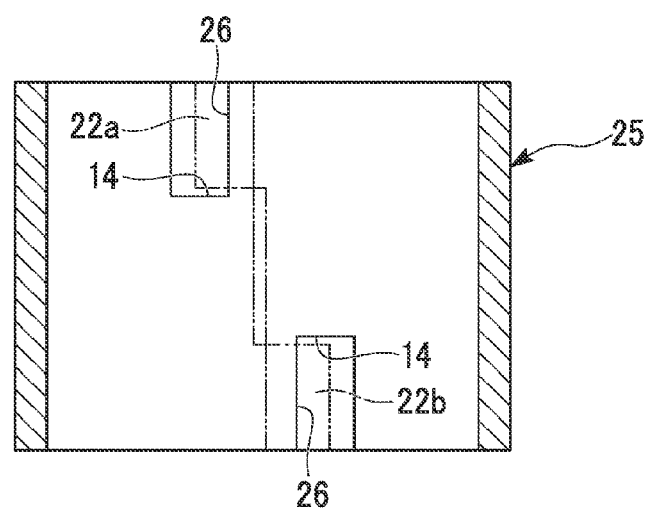
FIG. 3B is a cross-sectional view along a B-B line of FIG. 3A.
Figure 3C:
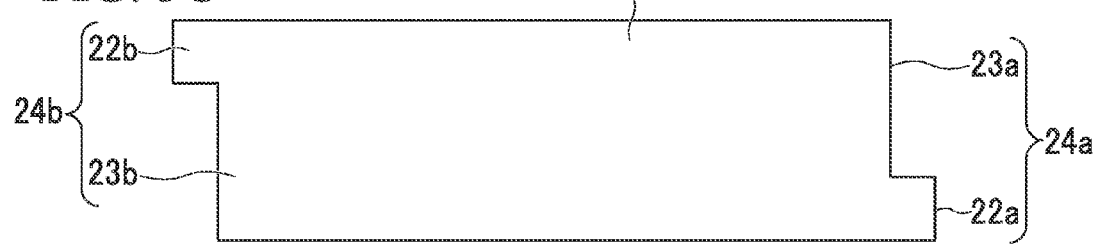
FIG. 3C is a developed plan view of a top foil.
Figure 3D:
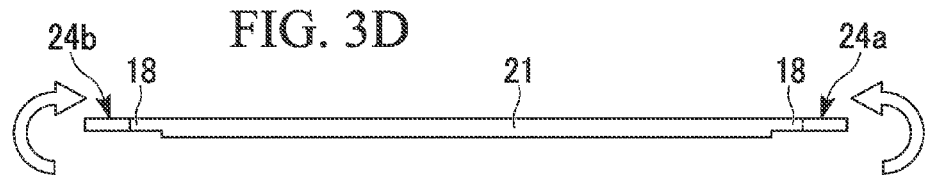
FIG. 3D is a developed side view of the top foil.

That is, in a top foil 21 of the radial foil bearing 20 of the present embodiment, as shown in FIG. 3C, a first uneven portion 24a including one projecting portion 22a (first projecting portion) and one depressed portion 23a (first depressed portion) is formed on a first side in the short sides thereof, and a second uneven portion 24b including one projecting portion 22b (second projecting portion) and one depressed portion 23b (second depressed portion) is formed on a second side opposite to the first side in the short sides. The depressed portion 23b of the second uneven portion 24b is formed so as to include a position corresponding to the projecting portion 22a of the first uneven portion 24a, and the depressed portion 23a of the first uneven portion 24a is formed so as to include a position corresponding to the projecting portion 22b of the second uneven portion 24b. In other words, the projecting portion 22a is formed in at least a portion of the position corresponding to the depressed portion 23b, and the projecting portion 22b is formed in at least a portion of the position corresponding to the depressed portion 23a.

That is, the depressed portion 23b of the second uneven portion 24b is formed to allow the projecting portion 22a to pass through the inner portion of the depressed portion 23b when the top foil 21 is wound in a cylindrical shape so that the first uneven portion 24a and the second uneven portion 24b overlap with each other. Similarly, the depressed portion 23a of the first uneven portion 24a is formed to allow the projecting portion 22b to pass through the inner portion of the depressed portion 23a when the top foil 21 is wound in a cylindrical shape. In addition, in the present embodiment, widths (widths in the axial direction of the radial foil bearing 20) of the depressed portions 23b and 23a are formed to be sufficiently wider than widths of the projecting portions 22a and 22b respectively.

Moreover, as shown in FIG. 3A, engagement grooves 26 are formed on an inner circumferential surface of a bearing housing 25 so as to correspond to the dispositions of the projecting portions 22a and 22b. That is, as shown in FIG. 3B which shows the inner circumferential surface of the bearing housing 25, two engagement grooves 26 are formed on the inner circumferential surface of the bearing housing 25, wherein each engagement grove 26 is provided on a portion of the entire length in the axial direction of the bearing housing.

One of the engagement grooves 26 is formed so as to extend from one side end of the bearing housing 25 toward the center thereof, and the other is formed so as to extend from the other side end of the bearing housing 25 toward the center. Moreover, the engagement grooves 26 are not disposed on the same straight line parallel to the axial direction of the bearing housing 25, and are disposed on different straight lines with a predetermined gap in the circumferential direction of the bearing housing 25.

Also in the radial foil bearing 20 having the above-described configuration, effects similar to those of the radial foil bearing 3 shown in FIGS. 2A to 2D can be obtained. That is, the projecting portions 22a and 22b which are respectively pulled out from the depressed portions 23b and 23a are engaged with the engagement grooves 26 which are formed on the inner circumferential surface of the bearing housing 25. Accordingly, the top foil 21 can be accommodated into and fixed to the bearing housing 25 without performing the spot welding or the bending with respect to the top foil 21 and without generating a strong reaction force from both end portions toward the center portion of the top foil due to both end portions of the top foil 21 butting the bearing housing 25. Therefore, since distortion occurring in the top foil 21 is suppressed and the distortion of the top foil 21 can be sufficiently decreased, the desired favorable performance can be exerted with respect to the load capability or dynamic characteristics (rigidity and damping performance) of the bearing.

In addition, since the thin portions 18 are formed on both end portions of the top foil 21, as described above, the force (local preload) clamping the rotary shaft 1 also does not occur in both end portions. Accordingly, an increase in the starting torque due to the preload can be prevented, or heat generation during the operation can be prevented from increasing to be equal to or more than a set value.

In addition, as shown in two-dot chain lines in FIG. 3B, since the movement of the projecting portions 22a and 22b engaging with the engagement grooves 26 toward an axially center portion (the inner side) of the bearing housing 25 is restricted by the bank portions 14 of the engagement grooves 26, the top foil 21 can be prevented from popping out from the bearing housing 25.

Moreover, the present invention is not limited to the above-described embodiments and is limited only by scopes of attached claims. The shapes, combinations or the like of components shown in the above-described embodiments are examples, and addition, omission, replacement, and other modifications in configurations can be performed within a scope which does not depart from the gist of the present invention.

For example, in the above-described embodiments, each of the first uneven portion and the second uneven portion is formed of one or two projecting portions and one or two depressed portions. However, the number of the projecting portions and depressed portions may be three or more.

Moreover, with respect to the thin portion 18, for example, etching processing may be performed on both surfaces (front surface and rear surface) of a foil, and thus, a thin portion may be formed in the foil.

INDUSTRIAL APPLICABILITY

The present invention can be widely used in a radial foil bearing which encloses and supports the rotary shaft.

REFERENCE SIGNS LIST

1 rotary shaft
3 radial foil bearing
10 top foil
11 bump foil (back foil)
12 bearing housing
13 engagement groove
13*a* first engagement groove
13*b* second engagement groove
14 bank portion
15*a* projecting portion (first projecting portion)
15*b* projecting portion (second projecting portion)
16*a* depressed portion (first depressed portion)
16*b* depressed portion (second depressed portion)
17*a* first uneven portion
17*b* second uneven portion
18 thin portion
20 radial foil bearing
21 top foil
22*a* projecting portion (first projecting portion)
22*b* projecting portion (second projecting portion)
23*a* depressed portion (first depressed portion)
23*b* depressed portion (second depressed portion)
24*a* first uneven portion
24*b* second uneven portion
25*b* bearing housing
26 engagement groove

The invention claimed is:

1. A radial foil bearing for enclosing and supporting a rotary shaft, the radial foil bearing comprising:
a cylindrical top foil disposed so as to face the rotary shaft;
a back foil disposed on a radially outer side of the top foil; and
a cylindrical bearing housing accommodating the top foil and the back foil,
wherein engagement grooves are formed on an inner circumferential surface of the bearing housing in an axial direction of the bearing housing,
wherein the top foil is formed by winding a rectangular metal foil around the rotary shaft in a circumferential direction thereof,
wherein the metal foil includes a first uneven portion which has a first projecting portion and a first depressed portion on a first side of the metal foil, and a second uneven portion which has a second depressed portion formed so as to include a position corresponding to the first projecting portion and a second projecting portion formed in at least a portion of a position corresponding to the first depressed portion, on a second side opposite to the first side, and the metal foil is wound in a cylindrical shape so that the first uneven portion and the second uneven portion overlap with each other,
wherein the first projecting portion and the second projecting portion are pulled out near the bearing housing through the second depressed portion and the first depressed portion respectively, and
wherein the first projecting portion and the second projecting portion, which are pulled out near the bearing housing, engage with the corresponding engagement grooves.

2. The radial foil bearing according to claim 1,
wherein at least one of the engagement grooves is formed in a portion of an entire length in the axial direction of the bearing housing.

3. The radial foil bearing according to claim 1,
wherein a thin portion is formed on each of the first side and the second side in the top foil, the thin portion being thinner than an intermediate portion between the first side and the second side.

4. The radial foil bearing according to claim 3,
wherein the thin portion is formed in a state where an outer circumferential surface of the thin portion is depressed further than an outer circumferential surface of the intermediate portion.

5. The radial foil bearing according to claim 4,
wherein at least one of the engagement grooves is formed in a portion of an entire length in the axial direction of the bearing housing.

6. The radial foil bearing according to claim 3,
wherein at least one of the engagement grooves is formed in a portion of an entire length in the axial direction of the bearing housing.

* * * * *